US007673742B2

United States Patent
Tippett et al.

(10) Patent No.: US 7,673,742 B2
(45) Date of Patent: Mar. 9, 2010

(54) PTFE CONVEYOR BELT

(75) Inventors: John W. Tippett, New Boston, NH (US); Stephen W. Tippett, New Boston, NH (US)

(73) Assignee: Textiles Coated Incorporated, Manchester, NH (US)

( * ) Notice: Subject to any disclaimer, the term of this patent is extended or adjusted under 35 U.S.C. 154(b) by 244 days.

(21) Appl. No.: 11/877,938

(22) Filed: Oct. 24, 2007

(65) Prior Publication Data
US 2008/0110728 A1 May 15, 2008

Related U.S. Application Data

(60) Provisional application No. 60/865,493, filed on Nov. 13, 2006.

(51) Int. Cl.
B65G 15/32 (2006.01)
B65G 15/42 (2006.01)
B65G 15/34 (2006.01)

(52) U.S. Cl. ............... 198/844.1; 198/606; 198/626.2; 198/461.3

(58) Field of Classification Search ............... 198/847, 198/500, 846
See application file for complete search history.

(56) References Cited

U.S. PATENT DOCUMENTS

| 3,936,338 | A | 2/1976 | Gibson |
| 3,962,153 | A | 6/1976 | Gore |
| 4,565,704 | A | 1/1986 | Dagerskog et al. |
| 4,668,524 | A | 5/1987 | Kirkpatrick |
| 4,800,090 | A | 1/1989 | August |
| 5,049,711 | A | 9/1991 | August |
| 5,077,072 | A | 12/1991 | Sieradzki |
| 5,231,919 | A | 8/1993 | Lawrence et al. |
| RE34,530 | E | 2/1994 | Kirkpatrick |
| 5,324,562 | A | 6/1994 | Mullinax et al. |
| 5,388,503 | A | 2/1995 | Buerkle |
| 5,458,051 | A | 10/1995 | Alden et al. |
| 5,466,531 | A | 11/1995 | Tippett et al. |
| 5,588,354 | A | 12/1996 | Stuck et al. |
| 5,817,177 | A | 10/1998 | Wallace |
| 5,938,007 | A * | 8/1999 | Fujihiro et al. ............ 198/847 |
| 5,951,895 | A | 9/1999 | Green et al. |
| 5,959,010 | A | 9/1999 | Schleunz |
| 6,113,967 | A | 9/2000 | Green et al. |
| 6,432,551 | B1 | 8/2002 | Brodeur, Jr. et al. |
| 6,868,622 | B2 | 3/2005 | Dillender |
| 6,919,122 | B2 | 7/2005 | Keese et al. |
| 7,211,210 | B2 | 5/2007 | Tippett |
| 7,464,809 | B2 * | 12/2008 | Nozaki et al. ............ 198/847 |

FOREIGN PATENT DOCUMENTS

EP 1355204 10/2003
WO WO96/16583 6/1996

* cited by examiner

Primary Examiner—Gene Crawford
Assistant Examiner—Kavel P Singh
(74) Attorney, Agent, or Firm—Gauthier & Connors LLP

(57) ABSTRACT

A method of manufacturing an endless conveyor belt comprises providing a flexible web in the form of a PTFE cross film laminate which in its as laminated state has a first length and a first lengthwise yield strength. The web is prestressed by lengthwise stretching to a second length greater than its as laminated first length to thereby achieve a second lengthwise yield strength greater than its as laminated first lengthwise yield strength. The ends of the prestressed web are then interconnected.

9 Claims, No Drawings

PTFE CONVEYOR BELT

CROSS REFERENCE TO RELATED APPLICATION

This application claims priority from provisional patent application Ser. No. 60/865,493 filed Nov. 13, 2006.

BACKGROUND

1. Field of the Invention

This invention relates generally to conveyor belts, and is concerned in particular with the provision of a conveyor belt comprised essentially of polytetrafluoroethylene ("PTFE").

2. Description of the Prior Art

PTFE resins possess many beneficial properties, such as excellent chemical resistance, high temperature capabilities, and superb release characteristics. Over time, it has proven very useful to access these properties in conveyor belting service for many industries, including for example food preparation, packaging, and chemical processing.

Conventionally, PTFE used in belting conveyor service have been coupled with some form of reinforcement for support. Typically, the reinforcement consists of a woven textile. The PTFE polymer is typically applied to the woven textile either by a coating process, or via lamination. By far, the main material used for reinforcement in PTFE conveyor service is woven fiberglass. Other materials are also used, such as Kevlar and Nomex products, but they are more costly and tend to be less effective due to temperature and/or chemical limitations.

Woven fiberglass, as a reinforcement for PTFE, offers many advantages and, unfortunately, a number of disadvantages. On the plus side, the fiberglass material is economical and possesses excellent high temperature properties. It is extremely strong on a strength/weight basis. Also, for many applications it provides good resistance to chemicals.

On the negative side, the woven fiberglass support is very susceptible to flex fatigue failure. If it encounters a point stress or load in belting service, it often will tear or crease, causing irreversible damage to the belting material. Because of the fatiguing properties, it is typically necessary to give consideration to belt rollers with larger diameters to minimize belt flexing. Very importantly, because fiberglass is a high modulus material, it does not readily accommodate elongation in belting service. This can make the belting product extremely difficult to track in service. In addition, fiberglass can be readily attacked by most of the chemicals that succeed in penetrating through the PTFE coating/film residing on the fiberglass surface.

Additionally, because both PTFE resins and fiberglass have very high temperature capabilities, many applications rely on transferring heat through the belting product. In these applications, thin woven fiberglass materials are required so that the heat can be effectively conducted. To achieve the required minimum thickness and low weight, the PTFE/fiberglass belting materials are produced on fine fiberglass fabrics that are particularly susceptible to damage in belting use. Some of the most severe belting applications involve the use of PTFE/fiberglass materials in cooking foods such as for example bacon, chicken, and hamburgers, at elevated temperatures on the order of 500° F.

Finally, the PTFE/fiberglass interface in belting products is a weak structural link. Because PTFE resins are difficult to bond to, high adhesions can be difficult to achieve at the PTFE/fiberglass interface. Also, the continual flexing of the belting material in service regularly breaks down the often tenuous adhesion between the fiberglass and the PTFE polymer. These factors usually lead to blistering or delamination of the PTFE component in the product. Blistering is a common cause for failure in PTFE/fiberglass belts cooking greasy foods at elevated temperatures.

In spite of the problems and difficulties noted above, and as demonstrated for example by the disclosures in U.S. Pat. Nos. 5,077,072; 5,388,503; 5,588,354; 5,951,895; 6,919,122; and WO 96/16583, those skilled in the art have continued to rely on reinforced PTFE materials for belting applications. This has been due in large part to the mistaken assumption that unreinforced PTFE has insufficient resistance to deformation, and that it lacks the strength properties to survive in belting applications, in particular those having hostile environments that involve exposure to corrosive chemicals, high temperatures and/or challenging mechanical loads.

The present invention stems from the surprising discovery that contrary to conventional thinking, an unreinforced PTFE film laminate, when properly constituted and conditioned, can serve as a reliable conveyor belting product under the most demanding conditions.

SUMMARY OF THE INVENTION

In accordance with the present invention, a method is provided for manufacturing an endless conveyor belt ideally suited for use in challenging environments, in particular those environments in which temperatures vary substantially from ambient and the belt is subjected to relatively high operational stresses in the lengthwise or conveying direction.

The method begins with the fabrication of a flexible web in the form of a PTFE cross film laminate having an "as laminated" length and lengthwise yield strength. As herein employed, the term "PTFE cross film laminate" means a multilayer composite of unsintered, unexpanded, uniaxially oriented PTFE films laminated directly together at an elevated sintering temperature, with the direction of orientation of at least one of the films being angularly disposed with respect to the direction of orientation of at least one other of the films. Also, as herein employed, "as laminated" means in the condition resulting directly from lamination, i.e., without any further processing other than cooling from the elevated sintering temperature employed during lamination. PTFE cross film laminates are available from Textiles Coated International of Manchester, N.H., USA, and are described in U.S. Pat. No. 5,466,531, the description of which is herein incorporated by reference in its entirety. The film components of the PTFE cross film laminate are preferably dry fibrillated PTFE films as described in U.S. Pat. No. 7,211,210, the description of which is also herein incorporated by reference in its entirety.

The thus fabricated web is next prestressed by lengthwise stretching to increase its as laminated yield strength to an elevated level selected to be at least as high, and preferably above that of the maximum operational stresses that the belt is expected to encounter in the intended conveyor application. Stretching can be performed in a single stage or in multiple stages. Each stage involves stretching the web lengthwise at a temperature ranging between ambient and 600° F., with a temperature of about 500° F. being preferred. The web is subjected to a lengthwise tensile stress that elevates the web's yield point above the yield point required for the application. The amount of tensile stress required is a function of the temperature the web is exposed to during the stretching process. As the stretching temperature is increased, the lengthwise tensile stress can be decreased. A typical range for the lengthwise tensile stress is from about 10 pli to 40 pli.

The ends to the prestressed web are then interconnected to thus complete the manufacture of the conveyor belt.

EXAMPLE

A flexible web comprising a PTFE cross film laminate was produced from nine plies of dry fibrillated PTFE feed films. The feed films were approximately 0.0013" in thickness, weighed approximately 1.95 oz/yd$^2$ and had an approximate specific gravity of about 2.0. The film plies were grouped in three stacks, with each stack containing three plies. The three plies of each stack were laid at 120° angles, with one ply aligned in the length direction of the web. The stacks were overlapped along the length of the web, and were laminated between heated platens at a pressure of 60 psi and a temperature of 715° F. The laminator platens were 12" wide, and the product was advanced into the laminator in 4" steps, with each step receiving a residence time of 25 seconds, resulting in each web section being exposed to a total residence time of 75 seconds. The resulting as laminated web was 49" wide by 72' in length, with a weight of 18.4 oz/yd$^2$ and a nominal thickness of 0.012". The as laminated web had a yield strength measured in accordance with ASTM D751 of 13 pli in both its length and width directions.

A roll of the web was taken to a two roll calender for stretching and prestressing. The roll was placed on a pay off station with back tensioning capability. As the material was paid off from the pay off station, it traveled across a flat heating plate that was mounted in front of the calender just before the nip of the two rolls. The heating plate was 50" wide and 24" in length. The temperature of the heating plate was set at 500° F. The material traveled across the heating plate at a speed of 1¼ ft/min, giving the material a residence time on the plate of 1.6 minutes. An insulating blanket comprising a ½" needled fiberglass mat rested on top of the web product to minimize heat loss as it slid across the heating plate.

A top metal roll with a width of 51" and a bottom paper roll with a width of 49" made up the two roll calender. Both rolls were operated at ambient temperatures during the product stretching. The calender was used to pull the product across the heating plate. A minimum calender force of between 200 pli and 300 pli was used during the stretching process.

The web material was passed through the calender assembly in two separate runs. As the web traveled across the heating plate in each run, it was heated to a temperature approximating that of the heated plate while being stretched. The first pass dropped the width of the web from 49" to 47¾", a 3% reduction. The web increased in length by 4% in the first pass. In the second pass, the width was reduced to 42½", a 13% reduction based on the initial width of 49". The length of the web increased by 21% in the second pass, again based on the starting length of the material.

As the web was pulled through the nip of the two roll calender, it quickly cooled due to contact with both the metal roll and the paper roll. In this manner, the web was effectively cooled under tension. A take up system rolled up the web after it lifted from the paper roll surface.

After having been cooled from the above noted elevated stretching temperature to ambient, in this case about 70° F., the stretched web had a width of 42.6", a length of 91', a weight of 17.15 oz/yd$^2$, a nominal thickness of 0.011", a substantially increased stress induced lengthwise yield strength of between about 22 to 24 pli, and a modestly increased yield strength in the width direction of 15 pli. The prestressed web was thus rendered suitable for belting applications that require a belt strength greater than its as laminated lengthwise yield strength of 13 pli but less than its prestressed lengthwise yield strength of 22 pli to 24 pli.

In light of the foregoing, and based additionally on ongoing field experiments with various belting applications, it has been determined that properly constituted PTFE cross film laminates in accordance with the present invention can indeed be conditioned to provide stress induced yield strengths in the length direction that are suitable for a wide range of belting applications, without the need to resort to fabric reinforcements.

While the stress induced yield strengths can vary over a wide range, it appears preferable that yield strengths in the length direction exceed those in the width direction by typically 30%, and that they be in the range of about 20 pli.

Laminate thicknesses may also vary, but for most belting applications, thicknesses of between about 5 to 20 mils are considered preferable.

The invention claimed is:

1. A method of manufacturing an endless conveyor belt, said method comprising:
    providing a flexible web comprising a multilayer composite of unsintered, unexpanded, uni-axially oriented PTFE films laminated directly together at an elevated sintering temperature, with the direction of orientation of at least one of said films being angularly disposed with respect to the direction of orientation of at least one other of said films, said web having an as laminated first length and first lengthwise yield strength;
    prestressing said web by lengthwise stretching to a second length greater than said first length to thereby achieve a second lengthwise yield strength greater than said first lengthwise yield strength; and
    interconnecting the ends of said prestressed web.

2. The method of claim 1 wherein said web is heated during stretching.

3. The method of claim 2 wherein said web is heated to a temperature of between about ambient and 600° F.

4. The method of claims 2 or 3 wherein said heating is accomplished by passing said web over a heated plate.

5. The method of claims 2 or 3 wherein said web is cooled under tension following heating.

6. The method of claims 1 or 2 wherein said web is stretched by being subjected to lengthwise tensile stresses of between about 10 pli to 40 pli.

7. A flexible web dimensioned in length and width directions for use as a conveyor belt, said web comprising a multilayer composite of unsintered, unexpanded, uni-axially oriented PTFE films laminated directly together at an elevated sintering temperature, with the direction of orientation of at least one of said films being angularly disposed with respect to the direction of orientation of at least one other of said films, said web having a lengthwise yield strength greater than its lengthwise yield strength in the as laminated condition.

8. The flexible web of claim 7 wherein said lengthwise yield strength is at least about thirty percent greater than the yield strength of said web in the width direction.

9. The flexible web of claims 7 or 8 having a thickness of between about 5 to 20 mils.

* * * * *